United States Patent
Foster et al.

(10) Patent No.: US 6,501,952 B1
(45) Date of Patent: Dec. 31, 2002

(54) APPARATUS, METHOD AND SYSTEM FOR MOBILE WIRELESS COMMUNICATION HAND-OFF UTILIZING DIRECTED CALL PICK-UP WITH BARGE-IN

(75) Inventors: Eugene William Foster, Naperville, IL (US); Kimberly Sue Tomasko-Dean, LaGrange, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/342,279

(22) Filed: Jun. 29, 1999

(51) Int. Cl.$^7$ ................................................ H04Q 7/20
(52) U.S. Cl. ...................... 455/436; 455/438; 455/439; 455/442; 370/331
(58) Field of Search ................................ 455/436, 438, 455/439, 442, 416; 370/331

(56) References Cited

U.S. PATENT DOCUMENTS

| | | | |
|---|---|---|---|
| 5,590,172 A | * 12/1996 | Lodwig et al. | ............... 379/58 |
| 5,909,487 A | * 6/1999 | Mainker | ..................... 379/209 |
| 5,940,758 A | * 8/1999 | Chavez, Jr. et al. | ......... 455/432 |
| 6,263,203 B1 | * 7/2001 | Jahn | ........................... 455/436 |

* cited by examiner

Primary Examiner—William Trost
Assistant Examiner—Eugene Yun
(74) Attorney, Agent, or Firm—Nancy B. Gamburd

(57) ABSTRACT

An apparatus, method and system are provided for hand-off of a communication session utilizing directed call pick up with barge-in, in which the communication session of a mobile unit is transferred from a serving base station to a target base station. The preferred system includes a switch coupled to a serving base station and a target base station, wherein the target base station includes instructions to generate a barge-in call path to a switch. The switch includes instructions to connect the barge-in call path to the communication session of the mobile unit to form a reverse three-way communication session. Following a provision for the mobile unit to communicate with the target base station for continuation of the communication session through the barge-in call path, the serving base station disconnects from the communication session. The barge-in call path from the target base station to the switch is established through the transmission of various messages between the target base station and the switch. In one of the embodiments, the target base station includes instructions to transmit a call set up message to the switch, to transmit a first sequence of information messages to the switch requesting a directed call pick up with barge-in, and to transmit a second sequence of information messages to the switch specifying a first pre-designated directory number associated with the communication session at the serving base station.

43 Claims, 3 Drawing Sheets

APPARATUS, METHOD AND SYSTEM FOR MOBILE WIRELESS COMMUNICATION HAND-OFF UTILIZING DIRECTED CALL PICK-UP WITH BARGE-IN

FIELD OF THE INVENTION

The present invention relates, in general, to wireless communication systems, and more particularly, to an apparatus, method and system for mobile wireless communication hand-off utilizing directed call pick up with barge-in.

BACKGROUND OF THE INVENTION

Mobile wireless communication systems typically employ many base stations (such as cell sites) to provide wireless communication throughout a given geographic region. As a mobile unit may traverse the geographic region, the communication to and from the mobile unit may occur through one or more of these base stations. To maintain an ongoing communication session during such transitions between base stations, various hand-off methods have evolved to transfer the wireless communication to the mobile unit from one base station to another base station, while maintaining such an ongoing call or session.

In the prior art, for some of the various methods utilized during such hand-offs, the communication session may suffer from some degree of interruption, which may be noticeable to the consumer of wireless communication services. As a consequence, a need remains to provide for comparatively seamless hand-offs, which do not interrupt ongoing communication sessions and which are imperceptible to the consumer.

In addition, while other prior art systems may provide comparatively seamless hand-offs, such hand-offs typically utilize considerable network resources. In an Autoplex® system, for example, in addition to switches and base stations, another network entity referred to as an Executive Call Processor ("CP") selects a server at the new cell site, while another network entity referred to as a Call Processing Database Node ("DN") transmits various data link messages to the current and new cell sites, adding an additional path to the existing call, directing the new cell site to activate a wireless voice link, and directing the current (serving) cell site to direct the mobile to retune to the new wireless voice link at the new cell site.

As a consequence, a need remains for a wireless communication system to provide comparatively seamless and imperceptible hand-offs. In addition, such a wireless communication system should be reasonably efficient and capable of cost-effective implementation, eliminating or minimizing the use of additional network resources.

SUMMARY OF THE INVENTION

The wireless communication system of the present invention provides virtually seamless and imperceptible hand-offs of communication sessions of mobile units. The various embodiments of the present invention are reasonably efficient and capable of cost-effective implementation in existing communication equipment such as switches and base stations. The various embodiments of the present invention may also be implemented in either digital or analog communication environments. Moreover, the various embodiments of the present invention eliminate or minimize the use of additional network resources such as ECPs and CDNs, while being compatible with other intelligent network devices and systems.

In accordance with the present invention, an apparatus, method and system are provided for hand-off of a communication session utilizing directed call pick up with barge-in, in which the communication session of a mobile unit is transferred from a serving base station to a target base station. The preferred system includes a switch coupled to a serving base station and a target base station. When a hand-off of the communication is indicated, the target base station generates, as a separate call, a barge-in call path to a switch. The switch then connects the barge-in call path to the communication session of the mobile unit to form a reverse three-way communication session between the mobile unit (via the serving base station), the target base station, and the switch. The serving base station then directs the mobile unit to communicate with the target base station for continuation of the communication session through the barge-in call path, and the switch releases the serving base station from the communication session.

As a consequence, the communication session of the mobile unit has been handed off, seamlessly and without interruption, from the serving base station to the target base station. Such a hand-off has also occurred utilizing minimal network resources, the switch and the base stations, without involvement of other intelligent or supervisory network elements.

The barge-in call path from the target base station to the switch is established through the transmission of various messages between the target base station and the switch. The switch is correspondingly configured to acknowledge and connect the barge-in call path to the communication session upon receipt of these various messages. In one of the embodiments, the target base station includes instructions to transmit a call set up message to the switch, to transmit a first sequence of information messages to the switch requesting a directed call pick up with barge-in, and to transmit a second sequence of information messages to the switch specifying a first predesignated directory number associated with the communication session at the serving base station. As discussed in greater detail below, these various messages may be combined in a variety of ways.

Numerous other advantages and features of the present invention will become readily apparent from the following detailed description of the invention and the embodiments thereof, from the claims and from the accompanying drawings.

DETAILED DESCRIPTION OF THE INVENTION

Figure 1:
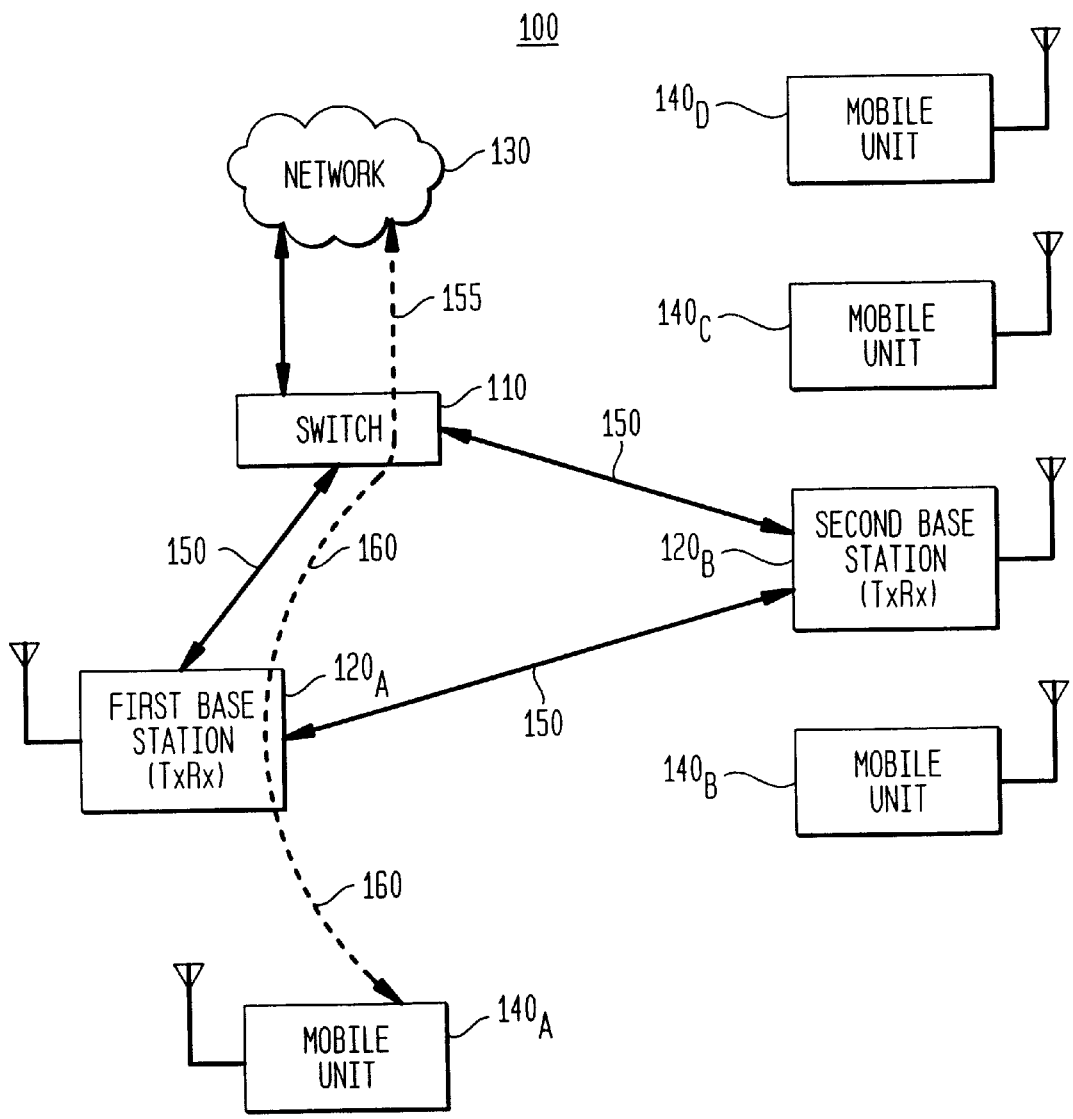
FIG. 1 is a block diagram illustrating a system embodiment, with a first communication path illustrated from a first base station to a mobile unit prior to a hand-off, in accordance with the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains for a wireless communication system to provide comparatively seamless and imperceptible hand-offs, which is reasonably efficient and capable of cost-effective implementation, and which eliminates or minimizes the use of additional network resources such as ECPs and CDNs. In accordance with the present invention, a system, apparatus and method are illustrated which provide such advantages, namely, providing relatively seamless and imperceptible wireless hand-offs while utilizing minimal network resources (namely, utilizing existing switches and base stations configured in accordance with the invention), while simultaneously eliminating the prior art utilization of other network elements such as ECPs and CDNs.

FIG. 1 is a block diagram illustrating such a system embodiment 100 in accordance with the present invention. As illustrated in FIG. 1, the system 100 includes a switch 110 and one or more base stations (equivalently, cell sites) 120, such as first base station $120^A$ and second base station $120_B$. The switch 110 is preferably a telecommunication switch such as a 5 ESS® switch manufactured by Lucent Technologies, Inc., which has been configured to operate in accordance with the present invention, as discussed in greater detail below. The switch 110 is coupled to a network 130, for additional call routing. The switch 110 may also be included within a mobile switching center, and may also be coupled to other intelligent network devices (not illustrated). The base stations 120 include wireless transceivers, for wireless communication with the various mobile units 140, such as cellular or other wireless telephones, wireless modems, or other wireless communication devices. The switch 110 and base stations 120 are coupled to each other utilizing signaling and/or trunking lines 150, as known in the art. In the preferred embodiment, the switch 110 is connected to the various base stations 120 utilizing Integrated Services Digital Network ("ISDN") Basic Rate Interfaces ("BRI") lines.

As any mobile unit 140 traverses a geographic region and becomes farther away from any given base station 120 with which it has been in communication, the signal or power levels of such wireless communication to and from the mobile unit 140 typically drop below a preferred threshold or range. Under these circumstances, it is preferable for the given base station 120 to hand-off the communication to another base station 120 having a higher signal strength to and from the given mobile unit 140. Continuing to refer to FIG. 1, for example, the mobile unit $140_A$ (at a time $t<t_1$) is currently served by first base station $120_A$, illustrated as communication or call path 160 (with the portion of the communication session between the switch 110 and the network 130 separately illustrated as call path 155). In these circumstances, the first base station $120_A$ is generally referred to as a serving base station or serving cell site. As the mobile unit $140^A$ travels toward the vicinity of mobile unit $140_c$, it may become necessary or preferable for the first, serving base station $120_A$ to hand-off the communication of mobile unit $140_A$ to the second base station $120_B$. In these circumstances, the second base station $120_B$ is generally referred to as a target base station or target cell site. Such a hand-off, in accordance with the present invention, is illustrated below with respect to FIG. 2.

Figure 2:
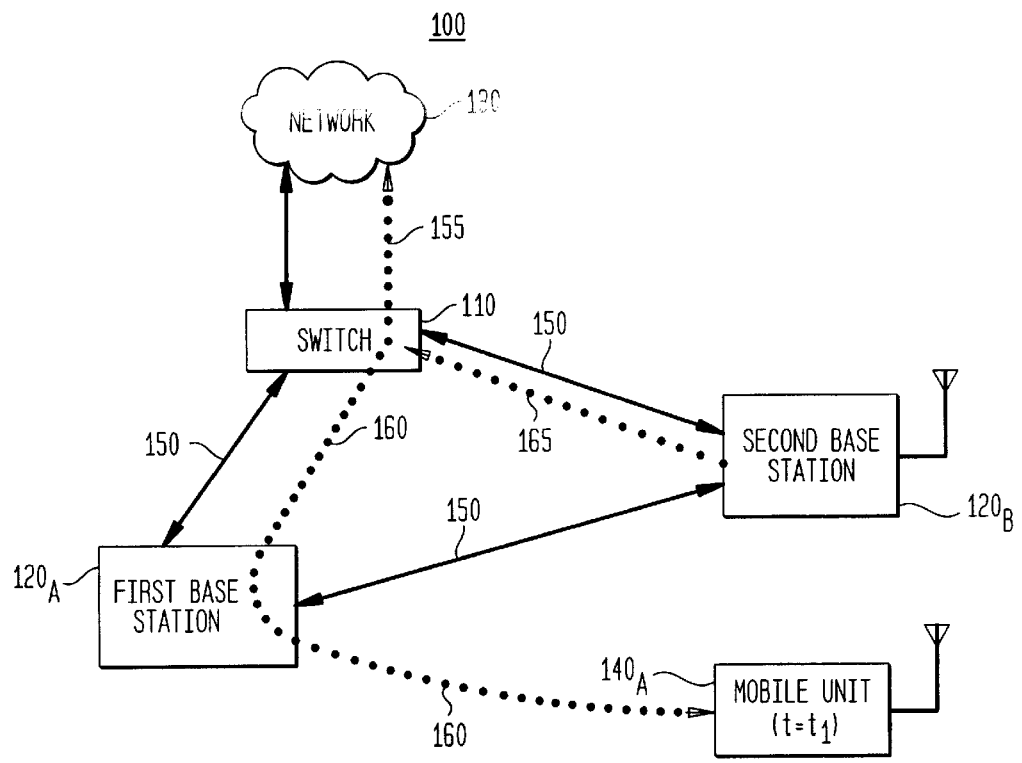
FIG. 2 is a block diagram illustrating a system embodiment, with the first communication path illustrated from the first base station to the mobile unit and a second, barge-in communication path illustrated during a hand-off, in accordance with the present invention.

FIG. 2 is a block diagram illustrating a system embodiment, with the first communication path illustrated from the first base station to the mobile unit and a second, barge-in communication path illustrated during a hand-off, in accordance with the present invention. To accomplish such a hand-off in accordance with the present invention, and as explained in greater detail below, the second, target base station 120Binitiates a communication session with the switch 110, which in turn is configured to allow this communication session with base station $120_B$ to "barge" into the call to the mobile unit $140_A$ (call path 160), illustrated as the additional leg or call path 165 in FIG. 2, effectively setting up a "reverse three-way" communication session between the mobile unit $140_A$ (via first, serving base station $120_A$), the switch 110, and the second (target) base station $120_B$. As discussed in greater detail below, this is accomplished through various call set up messages, the assignment of various directory numbers "DNs") to the base stations 140, and configuring the switch to recognize particular messages as indicative of a barge-in request for a hand-off. The completion of the hand-off then proceeds-as illustrated below with reference to FIG. 3.

Figure 3:
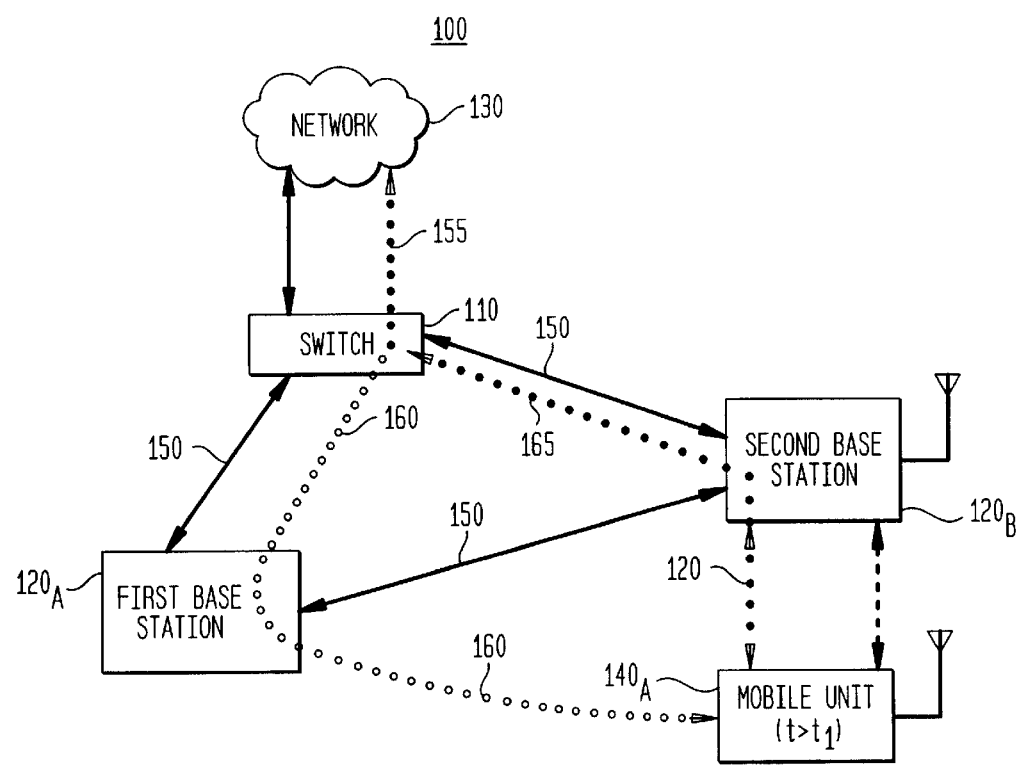
FIG. 3 is a block diagram illustrating a system embodiment, with the second communication path illustrated during completion of a hand-off and the commencement of a tear down of the first communication path, in accordance with the present invention.

FIG. 3 is a block diagram illustrating a system embodiment, with the second communication path illustrated during completion of a hand-off and the commencement of a tear down of the first communication path, in accordance with he present invention. When the "barge-in" call path 165 has been established (i.e., the barge-in is complete), in accordance with the present invention, the mobile unit $140_A$ subsequently (i.e., at a time t greater than or equal to time $t_1$), then tunes to a specified channel of or otherwise sets up a communication path to the base station $120_B$, illustrated as call path 170, for continuing the same communication session via the barge-in call path 165, (with the portion of the communication path 160 between the first base station $120_A$ and mobile unit $140_A$ being eliminated when the mobile unit establishes call path 170 to the second base station $120_B$). The hand-off of the communication session from the serving base station to the target base station is then complete, and the communication path 160 (from the switch 110 to the first base station $120_A$) may then be torn down, with the communication session continuing uninterrupted through links or call paths 155, 165 and 170, as illustrated in FIG. 3.

As may be apparent from the above discussion, the hand-off of the communication session, from the first, serving base station $120_A$ to the second, target base station $120_A$, utilizing the switch 110 configured for directed call pick up with barge-in, occurs seamlessly and without interruption. In addition, such a hand-off is accomplished without the need for additional network resources.

Another significant distinction of the present invention, once a target base station is selected, is that the actual hand-off of the communication session is originated by the target base station through generation of the barge-in call path. A marked departure from the prior art, the hand-off call path, in this case the barge-in call path, is not originated by the switch 110, by the serving base station, or by any other network entity.

Figure 4:
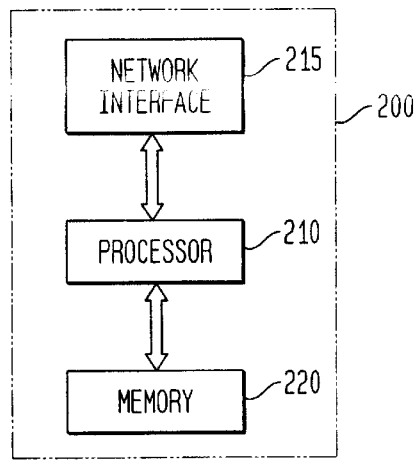
FIG. 4 is a block diagram illustrating an apparatus embodiment in accordance with the present invention.

FIG. 4 is a block diagram illustrating an apparatus embodiment 200 in accordance with the present invention. As discussed in greater detail below, such an apparatus 200 may be included within, or distributed among, a switch 110 and/or a base station 120 of a system 100. The apparatus 200 includes a processor 210, a network interface 215, and a memory 220. The network interface 215 is utilized to receive and to transmit various communication links or paths, such as to transmit barge-in call path 165, when the apparatus 200 is embodied within a base station 120, or to receive barge-in call path 165, when the apparatus 200 is embodied within a. switch 110. The network interface 215 is also utilized for transmission and reception of various requests and responses discussed below, such as call set up messages for the barge-in call path 165. The memory 220 may be a magnetic hard drive, an optical storage device, or any other type of data storage apparatus. The memory 220 is used to store information pertaining to call placement, call set up, routing information, and program instructions, as discussed in greater detail below.

Continuing to refer to FIG. 4,. the processor 210 may include a single integrated circuit "IC"), or may include a plurality of integrated circuits or other components connected, arranged or grouped together, such as microprocessors, digital signal processors "DSPs"), application specific integrated circuits "ASICs"), associated memory (such as RAM and ROM), and other ICs and components. As a consequence, as used herein, the term processor should be understood to equivalently mean and include a single processor, or arrangement of processors, microprocessors, controllers, or some other grouping of integrated circuits which perform the functions discussed above and also discussed in detail below with reference to FIG. 5, with associated memory, such as microprocessor memory or additional RAM, ROM, EPROM or E$^2$PROM. The methodology of the invention, as discussed above with reference to FIGS. 1–3 and as discussed below with reference to FIG. 5, may be programmed and stored, in the processor 210 with its associated memory (such as memory 220) and other equivalent components,as a set of program instructions for subsequent execution when the processor 210 is operative (i.e., powered on and functioning). As mentioned above, such an apparatus 200 may be included within, or distributed among, a switch 10 and/or a base station 120.

Figure 5:
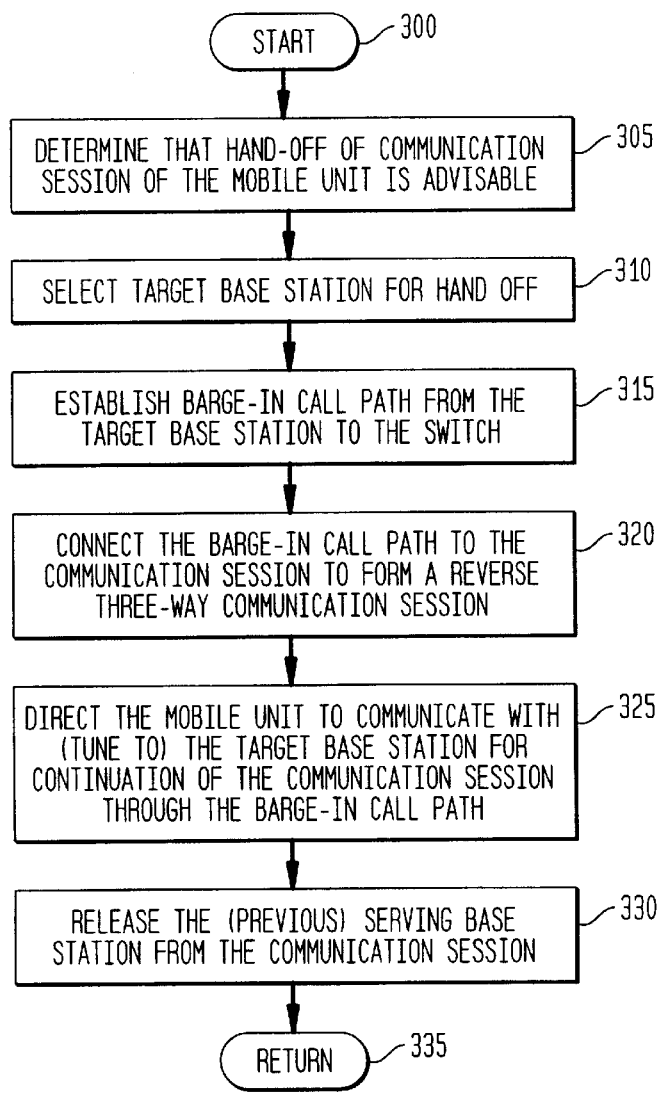
FIG. 5 is a flow diagram illustrating a method embodiment in accordance with the present invention.

FIG. 5 is a flow diagram illustrating a method embodiment in accordance with the present invention. Beginning with start step 300, the method determines that a hand-off is necessary or preferable, step 305. This may be accomplished through various methods known in the art, from various requests. transmitted by the serving base station, such as base station 120$_A$, with responses. from the potential target base stations, such as base station 120$_B$, or by determinations made by the particular mobile unit 140. Next, a target base station is selected for a hand-off, also as known in the art, step 310, such as second base station 120$_B$. In this selection process, the target base station 120 is provided with information concerning the directory number of the serving base station 120.associated with the established call path between the serving base station and the mobile unit, such as the directory number associated with the first base station 120$_A$ for the call path 160. The target base station, such as second base station 120$_B$, then transmits a call set up "SETUP") message, to the switch 110, for the call path barge-in, step 315.

In the preferred embodiment, step 315 may be accomplished in a variety of ways. First, the switch has been configured (populated) with an indicator that particular directory numbers "DNs") associated with the various base stations allow directed call pick up with barge-in. For a hand-off, the target base station 120 transmits a SETUP message to the switch 110 for a new call (or goes off-hook in an analog environment), and receives a corresponding acknowledgement from the switch 110 (or dial tone in analog). The target base station 120 then transmits one or more information "INFORMATION") messages to the switch 110, preferably information messages compatible with ISDN Q.931 standards. In the preferred embodiment, a sequence of one or more information messages are transmitted from the target base station 120 to the switch 110. A first sequence of information messages includes a feature activation information element designating directed call pick up with barge-in, followed by receipt of an acknowledgement by the target base station 120, such as information message or acknowledgement with a feature indication designating directed call pick up with barge-in or a recall dial tone. Alternatively, the sequence of information messages may designate such directed call pick up with barge-in utilizing keypad digits (dialed digits) as a keypad information element or field of the information messages, containing feature buttons as information elements (such as within a feature activation information element), or containing a predesignated code or other access codes. For example, an access code (such as "*70") may be configured and utilized within a keypad digits field to signal the switch 110 to invoke directed call pick up with barge-in. The second sequence of one or more information messages in the preferred embodiment designates the directory number of the serving base station associated with the call path 160 to the mobile unit 140 (into which the new call leg shall barge), such as a keypad information element set to the directory number). In lieu of two sequences of information messages, one sequence of one or more information messages may be utilized, providing information designating both the feature activation information element for directed call pick up with barge-in and the associated DN. In the preferred embodiment, within the various sequences of information messages, one information message is utilized per digit to be transmitted to the switch 110.

As additional alternatives for step 315, the initial SETUP message from the target base station to the switch 110 may include a feature activation information element designating directed call pick up with barge-in; or equivalently may include an access code (designating directed call pick up with barge-in) as a keypad digits information element. In these alternatives, the first sequence of information messages, (or portions thereof) and corresponding acknowledgement may be redundant and may be eliminated.

Next, in step 320, the target base station connects to the existing communication session, forming a reverse three-way call. In creating the barge-in, the switch 110 typically transmits a call proceeding message to the target base station 120, which in turn transmits a connect message to the switch 110, followed by the switch 110 transmitting a connect acknowledgement to the target base station 120, at which point the reverse three-way call is created between the switch, the mobile unit 140 (via first or serving base station 120$_A$) and the second (target) base station 120$_B$.

Following this creation of the reverse three-way session, (i.e., the barge-in call path 165 is complete), in accordance with the present invention, in step 325 the mobile unit 140$_A$ then tunes to a specified channel of or otherwise sets up a communication path to the target base station 120$_B$, such as illustrated in FIG. 3 as call path 170, for continuing the same communication session via the barge-in call path 165. In the preferred embodiment, a variety of methods may be utilized to provide for such establishment of call path 170; for example, the mobile unit $140_A$ may be directed by the serving base station to tune to a channel of the target base station, or the mobile unit $140_A$ may initiate such a tuning to the target base station. As the various target and serving base stations have independent signaling paths (illustrated generally as one of the signaling and/or trunking lines 150 in FIG. 1), the target base station then generally notifies the serving base station that the serving base station may now drop,(tear down) its portion of the three-way call (the portion of call path 160 between the first base station $120_A$ and switch 110). As a consequence, in step 330, the previously serving base station ($120_A$) disconnects from the three-way call, and the switch 110 releases the call to this previously serving base station, thereby tearing down the communication path 160 (from the switch 110 to the first base station $120_A$ and mobile unit $140_A$), with the communication session continuing uninterrupted through links or call paths 155, 165 and 170 as illustrated in FIG. 3. Step 330 is preferably accomplished by the transmission of a disconnect message transmitted from the previously serving base station $120_A$ to the switch 110, followed by a release message transmitted from the switch 110 to the base station $120_A$, followed by a release complete message transmitted from the previously serving base station $120_A$ to the switch 110. Following the release of step 330, the method may end, return step 335.

It should be noted that a second directory number may be associated with the barge-in call path at the target base station. As a consequence, if another hand-off is advisable between this base station (now a serving base station) and a third base station (now a target base station), the procedures outlined above may be repeated, utilizing this second directory number. This process may be continued for as many hand-offs as may be necessary for the given communication session of the mobile unit.

Numerous advantages of the present invention may be apparent from the above discussion. First, as illustrated above, the wireless communication system of the present invention provides virtually seamless and imperceptible hand-offs of communication sessions of mobile units. Second, the various embodiments of the present invention are reasonably efficient and capable of cost-effective implementation in existing communication equipment such as switches and base stations. The various embodiments of the present invention may also be implemented in either digital or analog communication environments. Moreover, the various embodiments of the present invention eliminate or minimize the use of additional network resources such as ECPs and CDNs, while being compatible with other intelligent network devices and systems.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method for hand-off of a communication session in a mobile wireless communication system, utilizing directed call pick up with barge-in, in which the communication session of a mobile unit is transferred from a serving base station to a target base station, the method comprising:

(a) establishing a barge-in call path from the target base station to a switch by transmitting a call set up message to the switch and further transmitting a sequence of information messages to the switch, the call set up message and the sequence of information messages requesting directed call pick up with barge-in and specifying a first predesignated directory number associated with the communication session at the serving base station;

(b) connecting the barge-in call path to the communication session to form a reverse three-way communication session;

(c) providing for the mobile unit to communicate with the target base station for continuation of the communication session through the barge-in call path; and (d) releasing the serving base station from the communication session.

2. The method of claim 2, wherein the directed call pick up with barge-in is specified as a feature activation information element in the first sequence of information messages.

3. The method of claim 1, wherein step (a) further comprises:

transmitting a first sequence of information messages to the switch requesting the directed call pick up with barge-in; and transmitting a second sequence of information messages to the switch specifying the first predesignated directory number associated with the communication session at the serving base station.

4. The method of claim 2, wherein the first predesignated directory number is specified as a keypad information element in the second sequence of information messages.

5. The method of claim 2, wherein the call setup message, the first sequence of information messages and the second sequence of information messages have a format compatible with an ISDN Q.931 standard.

6. The method of claim 1, wherein the sequence of information messages request directed call pick up with barge-in and specify the first predesignated directory number associated with the communication session at the serving base station.

7. The method of claim 1, wherein the call set up message requests directed call pick up with barge-in; and the sequence of information messages specify the first predesignated directory number associated with the communication session at the serving base station.

8. The method of claim 1, wherein step (b) further comprises:

transmitting a call proceeding message from the switch to the target base station; and transmitting a connect message from the target base station to the switch.

9. The method of claim 1, wherein the reverse three-way communication session is established between and among the serving base station, the switch and the target base station.

10. The method of claim 1, wherein step (d) further comprises:

transmitting a disconnect message from the serving base station to the switch; and transmitting a release message from the switch to the serving base station.

11. The method of claim 1 wherein a second predesignated directory number is associated with the barge-in call path of the continued communication session at the target base station.

12. A system for hand-off of a communication session utilizing directed call pick up with barge-in, in which the communication session of a mobile unit is transferred from a serving base station to a target base station, the system comprising:
- a switch;
- a plurality of base stations coupled to the switch, the plurality of base stations including the serving base station and the target base station, wherein the target base station includes instructions to generate a barge-in call path by transmitting a call set up message to the switch and transmitting a sequence of information messages to the switch, wherein the call set up message and the sequence of information messages request directed call pick up with barge-in and specify a first predesignated directory number associated with the communication session at the serving base station;
- wherein the switch includes instructions to connect the barge-in call path to the communication session to form a reverse three-way communication session; and
- wherein the mobile unit is directed to communicate with the target base station for continuation of the communication session through the barge-in call path, and wherein the serving base station is released from the communication session.

13. The system of claim 12, wherein the target base station includes further instructions to transmit a first sequence of information messages to the switch requesting directed call pick up with barge-in, and to transmit a second sequence of information messages to the switch specifying the first predesignated directory number associated with the communication session at the serving base station.

14. The system of claim 13, wherein the directed call pick up with barge-in is specified as a feature activation information element in the first sequence of information messages.

15. The system of claim 13, wherein the first predesignated directory number is specified as a keypad information element in the second sequence of information messages.

16. The system of claim 13, wherein the call set up message, the first sequence of information messages and the second sequence of information messages have a format compatible with an ISDN Q.931 standard.

17. The system of claim 12, wherein the sequence of information messages request directed call pick up with barge-in and specify the first predesignated directory number associated with the communication session at the serving base station.

18. The system of claim 12, wherein the call set up message requests directed call pick up with barge-in, and the sequence of information messages specify the first predesignated directory number associated with the communication session at the serving base station.

19. The system of claim 12, wherein the switch includes further instructions to transmit a call proceeding message to the target base station, and wherein the target base station includes further instructions to transmit a connect message to the switch.

20. The system of claim 12, wherein the reverse three-way communication session is established between and among the serving base station, the switch and the target base station.

21. The system of claim 12, wherein the serving base station includes further instructions to transmit a disconnect message to the switch, and wherein the switch includes further instructions to transmit a release message from the switch to the serving base station.

22. The system of claim 12 wherein a second predesignated directory number is associated with the barge-in call path of the continued communication session at the target base station.

23. An apparatus for hand-off of a communication session utilizing directed call pick up with barge-in, in which the communication session of a mobile unit is transferred from a serving base station to a target base station, the apparatus comprising:
- a network interface for communication with a switch and with the mobile unit;
- a memory storing instructions; and
- a processor coupled to the memory and to the network interface, wherein the processor includes instructions to generate a barge-in call path for connection to the communication session to form a reverse three-way communication session by transmitting to the switch, through the network interface, a call set up message and a sequence of information messages, wherein the call set up message and the sequence of information messages request directed call pick up with barge-in and specify a first predesignated directory number associated with the communication session at the serving base station; and wherein the processor includes further instructions to connect a received communication from the mobile unit to the barge-in call path for continuation of the communication session through the barge-in call path.

24. The apparatus of claim 23, wherein the processor includes further instructions to transmit to the switch, through the network interface, a first sequence of information messages requesting directed call pick up with barge-in, and a second sequence of information messages specifying the first predesignated directory number associated with the communication session at the serving base station.

25. The apparatus of claim 24, wherein the directed call pick up with in is specified as a feature activation information element in the first sequence of information messages.

26. The apparatus of claim 24, wherein the first predesignated directory number is specified as a keypad information element in the second sequence of information messages.

27. The apparatus of claim 24, wherein the call set up message, the first sequence of information messages and the second sequence of information messages have a format compatible with an ISDN Q.931 standard.

28. The apparatus of claim 23, wherein the sequence of information messages request directed call pick up with barge-in and specify the first predesignated directory number associated with the communication session at the serving base station.

29. The apparatus of claim 23, wherein the call set up message designates directed call pick up with barge-in, and the sequence of information messages specify the first predesignated directory number associated with the communication session at the serving base station.

30. The apparatus of claim 23, wherein the processor includes further instructions, upon reception through the network interface of a call proceeding message, to transmit, through the network interface, a connect message to the switch.

31. The apparatus of claim 23, wherein the apparatus is included within target base station.

32. The apparatus of claim 31 wherein the reverse three-way communication session is established between and among the serving base station, the switch and the target base station.

33. An apparatus for hand-off of a communication session utilizing directed call pick up with barge-in, in which the communication session of a mobile unit is transferred from a serving base station to a target base station, the apparatus comprising:

a network interface for communication with the target base station and the serving base station;

a memory storing instructions; and a processor coupled to the memory and to the network interface, wherein upon reception through the network interface of a barge-in call path from the target base station, the reception of the barge-in call path including reception of a call set up message and reception of a sequence of information messages, the call set up message and the sequence of information messages requesting directed call pick up with barge-in and specifying a first predesignated directory number associated with the communication session at the serving base station, the processor includes instructions to connect the barge-in call path to the communication session to form a reverse three-way communication session for continuation of the communication session through the barge-in call path following communication of the mobile unit with the target base station.

34. The apparatus of claim 33, wherein the reception of the barge-in call path further includes reception of a first sequence of information messages requesting directed call pick up with barge-in, and reception of a second sequence of information messages specifying the first predesignated directory number associated with the communication session at the serving base station.

35. The apparatus of claim 34, wherein the directed call pick up with barge-in is specified as a feature activation information element in the first sequence of information messages.

36. The apparatus of claim 34, wherein the first predesignated directory number is specified as a keypad information element in the second sequence of information messages.

37. The apparatus of claim 34, wherein the call set up message, the first sequence of information messages and the second sequence of information messages have a format compatible with an ISDN Q.931 standard.

38. The apparatus of claim 33, wherein the sequence of information messages request directed call pick up with barge-in and specify the first predesignated directory number associated with the communication session at the serving base station.

39. The apparatus of claim 33, wherein the call set up message designates directed call pick up with barge-in, and the sequence of information messages specify the first predesignated directory number associated with the communication session at the serving base station.

40. The apparatus of claim 33, wherein the processor includes further instructions to transmit, via the network interface, a call proceeding message to the target base station, and wherein the processor includes further instructions to receive, via the network interface, a connect message from the target base station.

41. The apparatus of claim 33, wherein the processor includes further instructions upon reception, via the network interface, of a disconnect message from the serving base station, to transmit a release message to the serving base station.

42. The apparatus of claim 33, wherein the apparatus is included within a switch.

43. The apparatus of claim 42, wherein the reverse three-way communication session is established between and among the serving base station, the switch and the target base station.

* * * * *